(12) United States Patent
Torriere

(10) Patent No.: US 12,440,852 B1
(45) Date of Patent: *Oct. 14, 2025

(54) SYSTEM AND PROCESS FOR SORTING AND RECOVERY OF RECYCLABLE MATERIALS FROM MIXED MUNICIPAL SOLID WASTE

(71) Applicant: WM Intellectual Property Holdings, L.L.C., Houston, TX (US)

(72) Inventor: Robert Torriere, Tyngsborough, MA (US)

(73) Assignee: WM INTELLECTUAL PROPERTY HOLDINGS, L.L.C, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,490

(22) Filed: Jul. 5, 2023

Related U.S. Application Data

(63) Continuation of application No. 17/881,466, filed on Aug. 4, 2022, now Pat. No. 11,707,747.

(60) Provisional application No. 63/229,950, filed on Aug. 5, 2021.

(51) Int. Cl.
*B03B 9/06* (2006.01)

(52) U.S. Cl.
CPC .................................... *B03B 9/06* (2013.01)

(58) Field of Classification Search
CPC .. B03B 9/06; B03B 9/061; B03B 1/23; B03B 1/30; B07B 1/14; B07C 5/342
See application file for complete search history.

(56) References Cited

U.S. PATENT DOCUMENTS

| | | | |
|---|---|---|---|
| 3,848,813 A | 11/1974 | Stanczyk et al. |
| 4,065,282 A | 12/1977 | Morey |
| 4,460,131 A | 7/1984 | Cerroni |
| 4,730,790 A | 3/1988 | Williams |
| 4,874,134 A | 10/1989 | Wiens |
| 5,071,075 A | 12/1991 | Wiens |
| 5,101,977 A | 4/1992 | Roman |

(Continued)

FOREIGN PATENT DOCUMENTS

WO    2004/012866    2/2004

OTHER PUBLICATIONS

Couling, Tom; Recovering Recyclables Through Mized Waste Processing; Public Works 124.n2:p. 53; Hanley-Wood, Inc.; Feb. 1993; 3 pages.

(Continued)

*Primary Examiner* — Joseph C Rodriguez
(74) *Attorney, Agent, or Firm* — Greenberg Traurig LLP

(57) ABSTRACT

A system and process for sorting and recovery of recyclable materials, and in particular, sorting and recovery of recyclable materials from mixed waste comprising municipal solid waste in a materials recovery facility or "MRF" are provided. Advanced technology and machinery are integrated into a multi-step system and process that are designed to treat contaminated MSW streams to meet or exceed minimum material quality specifications while also reducing and minimizing headcount of sorter personnel. Because the mix of materials in MSW can be so varied and unpredictable, the system and process are designed to effectively sort and recover desired materials from MSW streams having a variety of material compositions.

3 Claims, 2 Drawing Sheets

(56) References Cited

U.S. PATENT DOCUMENTS

| | | | |
|---|---|---|---|
| 5,148,758 A | 9/1992 | Saly et al. |
| 5,184,780 A | 2/1993 | Wiens |
| 5,250,100 A | 10/1993 | Armbristor |
| 5,333,738 A | 8/1994 | Fuchs et al. |
| 5,649,785 A | 7/1997 | Djerf et al. |
| 6,136,590 A | 10/2000 | Kruse |
| 6,250,472 B1 | 6/2001 | Grubbs et al. |
| 6,264,038 B1 | 7/2001 | Schmidt |
| 6,527,206 B1 | 3/2003 | Wuebbels et al. |
| 6,578,783 B2 | 6/2003 | Simon et al. |
| 6,974,097 B2 | 12/2005 | Simon et al. |
| 7,389,880 B2 | 6/2008 | Goldmann et al. |
| 7,503,513 B2 | 3/2009 | Simon et al. |
| 7,584,856 B2 | 9/2009 | Miller et al. |
| 7,810,646 B2 | 10/2010 | Miller et al. |
| 8,146,841 B2 | 4/2012 | Andela |
| 8,322,639 B2 | 12/2012 | Gitschel |
| 8,393,558 B2 | 3/2013 | Gitschel |
| 8,398,006 B2 | 3/2013 | Gitschel |
| 8,459,466 B2 | 6/2013 | Duffy et al. |
| 8,579,997 B2 | 11/2013 | Bai |
| 8,684,288 B2 | 4/2014 | Gitschel |
| 8,813,972 B1 | 8/2014 | Centers |
| 9,061,289 B2 | 6/2015 | Gitschel |
| 9,545,650 B2 | 1/2017 | Wang et al. |
| 9,649,666 B2 | 5/2017 | Gitschel |
| 9,713,812 B1 | 7/2017 | Gitschel |
| 9,884,324 B2 | 2/2018 | Gitschel |
| 10,835,927 B2 | 11/2020 | Torriere |
| 11,117,169 B2 | 9/2021 | Torriere |
| 11,707,747 B1 * | 7/2023 | Torriere | B03B 9/061 588/1 |
| 11,717,857 B2 | 8/2023 | Torriere |
| 2003/0183705 A1 | 10/2003 | Christiani et al. |
| 2005/0126958 A1 | 6/2005 | Bohlig et al. |
| 2005/0242006 A1 | 11/2005 | Bohlig et al. |
| 2006/0254957 A1 | 11/2006 | Bohlig et al. |
| 2008/0041982 A1 | 2/2008 | Paulson et al. |
| 2008/0197058 A1 | 8/2008 | Kenny |
| 2009/0008298 A1 | 1/2009 | Studley |
| 2012/0199519 A1 | 8/2012 | Ward |
| 2012/0217328 A1 | 8/2012 | Bohlig et al. |
| 2015/0283551 A1 | 10/2015 | Gitschel |
| 2016/0339445 A1 | 11/2016 | Robinson |
| 2017/0226439 A1 | 8/2017 | Nguyen et al. |
| 2018/0037830 A1 | 2/2018 | Bohlig et al. |
| 2018/0229273 A1 | 8/2018 | Carvajo Lucena et al. |
| 2019/0217342 A1 | 7/2019 | Parr et al. |
| 2020/0129989 A1 | 4/2020 | Schultz |
| 2020/0171547 A1 | 6/2020 | Torriere |
| 2021/0060618 A1 | 3/2021 | Torriere |
| 2021/0402439 A1 | 12/2021 | Torriere |
| 2025/0018401 A1 | 1/2025 | Torriere et al. |

OTHER PUBLICATIONS

Public Works; Refuse Processing and Resource Recovery; Public Works 125 n5: p. E22; Hanley-Wood, Inc.; Apr. 15, 1994; 18 pages.

Schneider, Robert J. et al.; Multilevel MRF Solves Solid Waste Challenges; BioCycle 34.5: 62.J.G.; Press Inc.; May 1993; 4 pages.

Canadian Intellectual Property Office; Office Action, issued in connection to application No. 3,063,184; Mar. 28, 2025; 4 pages; Canada.

* cited by examiner

SYSTEM AND PROCESS FOR SORTING AND RECOVERY OF RECYCLABLE MATERIALS FROM MIXED MUNICIPAL SOLID WASTE

1. RELATED APPLICATIONS

This application is a continuation application and claims the benefit, and priority benefit, of U.S. patent application Ser. No. 17/881,466, filed Aug. 4, 2022, which claims the benefit, and priority benefit, of U.S. Provisional Patent Application Ser. No. 63/229,950, filed Aug. 5, 2021, the disclosure and contents of which are incorporated by reference herein in their entirety.

BACKGROUND

2. Field of the Invention

This invention relates generally to sorting and recovery of recyclable materials from mixed solid waste in a materials recovery facility (MRF).

3. Description of the Related Art

It is known in the art that a materials recovery facility (MRF, pronounced "murf") can receive mixed waste comprising municipal solid waste (MSW) and separate recyclable materials from the mixed waste through a combination of manual and mechanical sorting. The sorted recyclable materials can undergo additional processing required to meet technical specifications for re-use, while the balance of the mixed waste can be sent to a disposal facility such as a landfill. However, prior systems and methods are inefficient, time-consuming and expensive.

Improvements to this technology are therefore desired.

SUMMARY

The following presents a simplified summary of the disclosed subject matter in order to provide a basic understanding of some aspects thereof. This summary is not an exhaustive overview of the technology disclosed herein.

In certain illustrative embodiments, a process for sorting and recovering materials from a solid waste stream is provided, which can include: screening the solid waste stream in a primary screener to separate corrugated cardboard from the solid waste stream; screening the solid waste stream in a secondary screener comprising a vibrating sizing screen to separate 2D materials from 3D materials, resulting in a 2D solid waste stream having 2D materials with a size greater than ten inches and comprising paper, film plastic, cardboard, brown fiber and containers, and a 3D solid waste stream having 3D materials with a size less than ten inches and comprising cardboard, plastic containers, aluminum containers and fines; passing the 2D solid waste stream through one or more optical sorters to separate plastic, cardboard, and brown fiber from the 2D solid waste stream; recombining the 2D solid waste stream and the 3D solid waste stream to produce a recombined solid waste stream; introducing the recombined solid waste stream into a mechanical separator and separating the recombined solid waste stream into containers materials comprising bottles and cans, and other materials; passing the containers materials through one or more eddy current separators to remove all or substantially all non-ferrous metals; and passing the containers materials though one or more optical sorters to remove residual fiber materials.

BRIEF DESCRIPTION OF THE DRAWINGS

A better understanding of the presently disclosed subject matter can be obtained when the following detailed description is considered in conjunction with the following drawings, wherein.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates generally to a system and process for sorting and recovery of recyclable materials, and in particular, sorting and recovery of recyclable materials from mixed waste comprising municipal solid waste in a materials recovery facility or "MRF." The subject matter is described more fully hereinafter with reference to the accompanying drawings in which embodiments of the system and process are shown. The system and process may, however, be embodied in many different forms and should not be construed as limited to the embodiments set forth herein; rather, these embodiments are provided so that this disclosure will be thorough and complete, and will fully convey the scope of the system and process to those skilled in the art.

As used herein, the term "municipal solid waste" or "MSW" means residential, commercial or industrial waste that includes, but is not limited to, one or more of the following materials: heavier weight materials (i.e., aggregates, glass, textiles, rubber, etc. . . . ), medium weight materials (i.e., fibers and rigid plastics), lighter weight materials (i.e., foam plastics and film plastics), PVC plastics, ferrous and non-ferrous metals, inert residues, organic materials (i.e., food waste) and very heavy and/or bulky materials. As used herein, the term "fibers" includes paper and/or cardboard and like materials, and the term "clean plastics" includes rigid plastics, foam plastics and film plastics and like materials.

In certain illustrative embodiments, the presently disclosed subject matter utilizes advanced technology and machinery which are integrated into a multi-step system and process that are designed to treat contaminated MSW streams to meet or exceed minimum material quality specifications while also reducing and minimizing headcount of sorter personnel. Because the mix of materials in MSW can be so varied and unpredictable, it is especially desirable to have a system and process that can effectively sort and recover desired materials from MSW streams having a variety of material compositions.

Figure 1A:
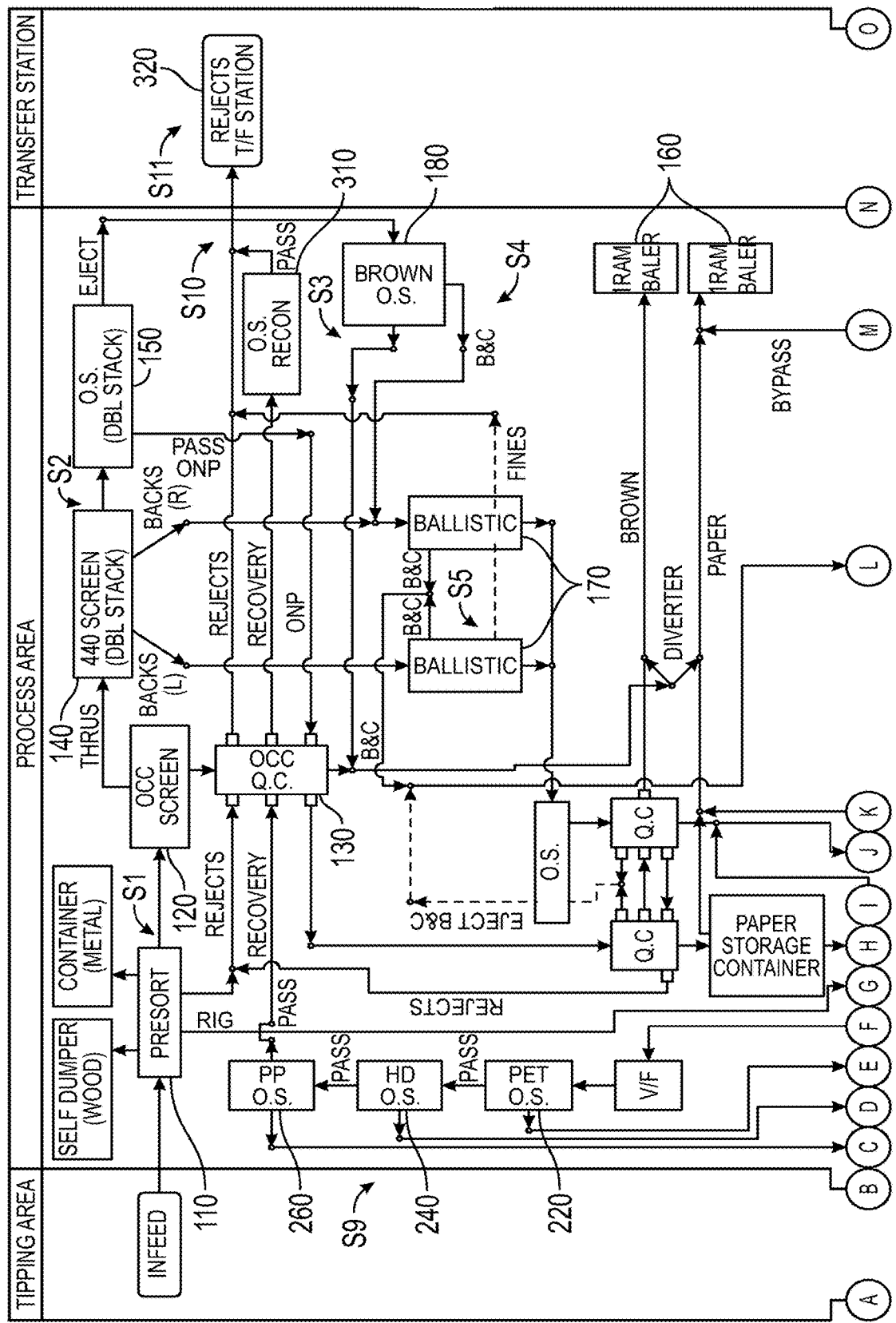
FIGS. 1A and 1B depict a process flow diagram for a single stream materials recovery facility in accordance with an illustrative embodiment of the presently disclosed subject matter.
Figure 1B:
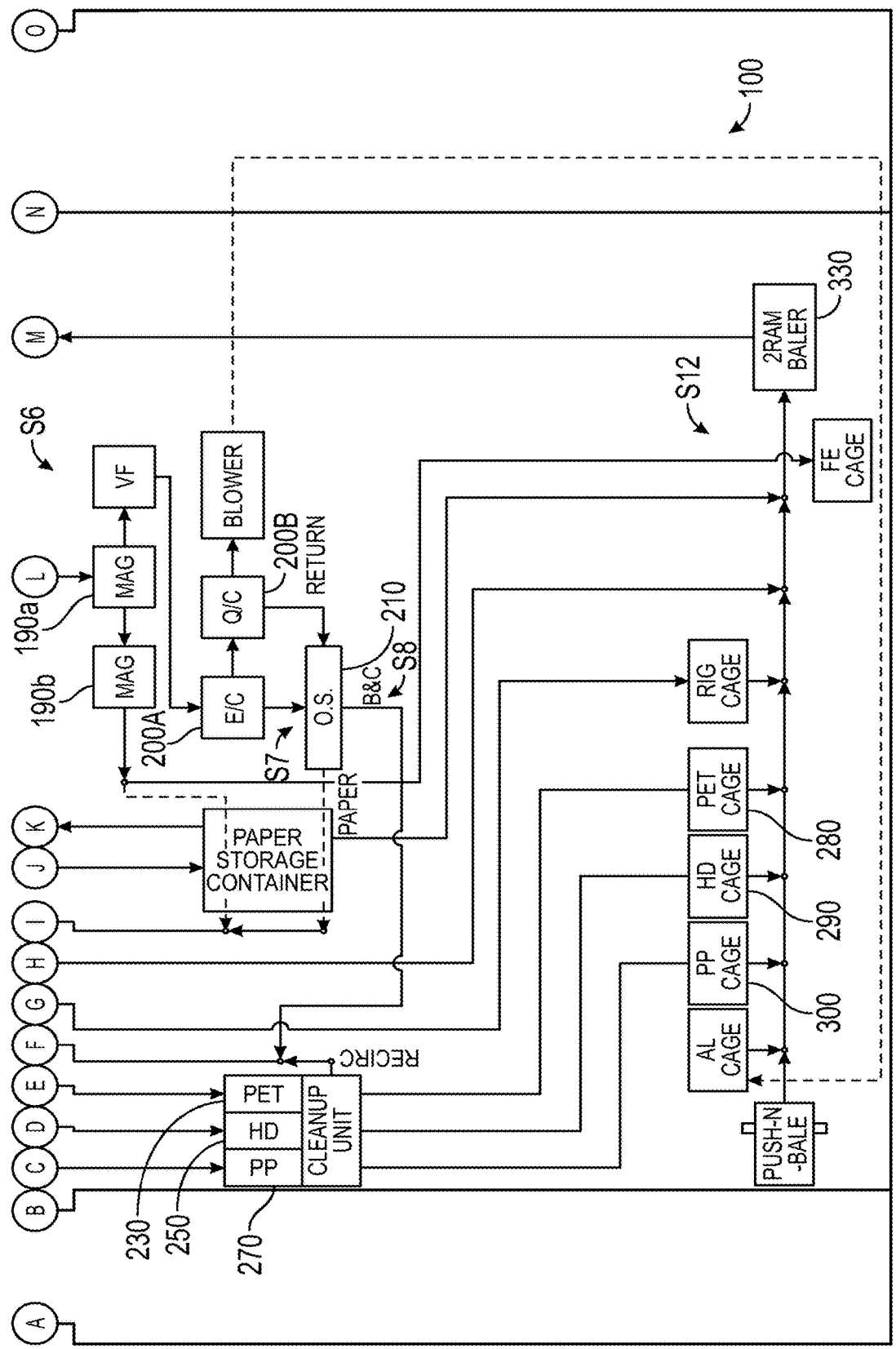

An illustrative embodiment of a flow diagram for a process 100 with related and associated system equipment is shown in FIGS. 1A & 1B herein, and includes the following stages:

Stage 1 (S1):

In Stage 1, removal of OCC (old corrugated cardboard) and bulky items can occur. For example, in a presort area 110, raw material on a tipping floor (infeed) can be fed via front-end loader into the process equipment system. The raw material can be conveyed onto an OCC screen separator 120 by which OCC and bulky items are automatically removed from the stream and conveyed to a quality control area to remove any contaminants. Mixed rigid plastics and bulky metals can also be extracted at the quality control area.

In certain illustrative embodiments, e.g., as shown in FIG. 1A, in-bound solid waste collection vehicles entering the process facility can discharge their municipal solid waste (MSW) onto the inbound tipping floor in or near the presorting area 110, and presorting can occur at this stage. Large bulky contaminant materials that are readily identifiable such as 2×4 lumber can be removed by hand or by a material handler such as an excavator or a front-end loader. A self-dumper (for wood) and container removal (for metals) can also be utilized.

In certain illustrative embodiments, an OCC size screen 120 can then be utilized to remove OCC and bulky items (such as rigid plastics and bulky metals) from the material stream. The "overs" stream (that is, the removed materials such as clean cardboard) from the OCC size screen 120 can pass through a quality control (QC) station 130 where contaminants can be manually or automatically extracted for removal. Also, OCC QC inspectors can manually remove any contaminants as well as mixed rigid plastics (e.g., plastic buckets) and bulky metals at quality control station 130.

Stage 2 (S2):

In Stage 2, initial fiber and container separation can occur. In certain illustrative embodiments, the raw material (after passing the OCC size screen 120) can be conveyed to an initial fiber and container separation area which uses a vibrating sizing screen 140 to screen the materials by size and shape. The vibrating sizing screen 140 can be, for example, a pair of double deck 440 screens, capable of separating 2D materials (such as film plastic, paper, cardboard and fibers) from 3D materials (such as plastic and aluminum containers, plastic bottles and cans). 2D "overs" fiber at a size >10" can go over the two 440 screens. This overs fiber can then undergo quality control using a pair or double-stack of optical sorters (OS) 150, with an individual optical sorter 150 designated for each deck. The non-paper 2D, which is film plastic, cardboard, and any 2D containers, is ejected out of optical sorters 150 and delivered to Stage 3. This leaves behind high quality white paper, which then passes through one or more human sorters at quality control station 130 for a final quality control check and then goes to a single ram baler 160. The 3D material having a size <10" goes through the openings in, or rolls off of, the OCC size screen 120 and is known as the "backs and throughs." This material is made up of smaller paper, cardboard, all grades (1-7s) of plastic containers, tin cans, aluminum containers, fines, and trash. The bulk of large fiber has been removed from this "backs and throughs" material before the material is delivered to one or more mechanical separators such as ballistic separators 170 at Stage 5.

Stage 3 (S3):

In Stage 3, separation of the ejected 2D non-paper stream from Stage 2 can occur. The non-paper stream is made up of film plastic, cardboard and other brown fiber, and containers. In certain illustrative embodiments, the non-paper stream is delivered to an optical sorter 180 where any OCC (cardboard) and brown fiber are ejected, and then the stream is returned to the main OCC QC output line to be fed directly to baler 160 such as a cardboard baler. The remaining fraction of film and containers from optical sorter 180 is the pass fraction and proceeds to the one or more ballistic separators 170 for additional sorting.

Stage 4 (S4):

In Stage 4, the non-ejected fraction at optical sorter 180 comprising film and containers from the 2D stream of Stage 3, and the 3D stream of Stage 2 comprising backs and throughs from OCC size screen 120, are recombined into a recombined solid waste stream that is delivered to the one or more ballistic separators 170 for additional sorting.

Stage 5 (S5):

In Stage 5, 2D, 3D, and fines separation can occur. In certain illustrative embodiments, the combined streams from the Stage 4 sizing separation are conveyed to the one or more ballistic separators 170 for performing of three separations: (i) smaller glass/fines material (which is accumulated and then conveyed to the glass processing area at Stage 10); (ii) an overs fraction of 2D material (mostly mixed paper which is discharged to a quality control area at Stage 8 to eject contaminants, containers, and cardboard from the paper); and (iii) a "backs" or 3D fraction which includes containers (bottles and cans), which is directed to Stage 6.

Stage 6 (S6):

In Stage 6, the 3D material from Stage 5 is conveyed to one or more magnets 190 which remove ferrous material. In certain illustrative embodiments, a primary magnet 190a can remove ferrous items and a secondary magnet 190b can provide quality control.

Stage 7 (S7):

In Stage 7, non-ferrous removal can occur. The remaining material from Stage 6 is delivered to a non-ferrous separator 200 to eject non-ferrous metals material. In certain illustrative embodiments, the non-ferrous separator 200 can comprise one or more eddy current (E/C) separators which use eddy current fields to eject selected materials (mostly aluminum cans). In certain illustrative embodiments where two in-line eddy current separators are utilized, as shown in FIGS. 1A & 1B, the second separator 200B performs a quality control of the ejected stream from the first separator 200A to provide additional "fine-tuning" before the non-ferrous metal is conveyed to a dedicated non-ferrous baler.

Stage 8 (S8):

In Stage 8, residual fiber removal can occur. The remaining material from Stage 7 is conveyed to an optical sorter (OS) 210 to remove any residual fiber/paper from the material stream. The ejected paper is then conveyed to, and combined with, the 2D paper stream from Stage 5.

In certain illustrative embodiments, the sequences of Stage 6, Stage 7 and Stage 8 are interchangeable.

Stage 9 (S9):

In Stage 9, plastics sorting can occur. The remaining material from Stage 8 is conveyed to a plastics sorting area to either automatically or manually extract PET (polyethylene terephthalate), HDPE (high-density polyethylene), and PP (polypropylene) plastics materials. The extracted materials may be sent to a quality control area to remove contaminants.

In certain illustrative embodiments, a PET optical sorter 220 can eject PET (polyethylene terephthalate) plastics material such as polyesters, thermoformed sheets, strapping, and soft drink bottles. The PET material is then run through a second PET quality control optical sorter 230 to remove any contaminants before being discharged in a slow-moving staging conveyor to a PET cage 280 and then baled.

Pass material from the PET optical sorter 220 can be conveyed to an HDPE optical sorter 240 which ejects HDPE (high-density polyethylene) plastics material such as bottles, grocery bags, milk jugs, recycling bins, agricultural pipe, base cups, car stops, playground equipment, and plastic lumber. The HDPE material can also be run through a second HDPE quality control optical sorter 250 to remove any contaminants before being discharged in a staging conveyor to a HDPE storage cage 290 and then baled.

Pass material from the HDPE optical sorter 240 can be conveyed to a PP optical sorter 260 which ejects PP (polypropylene plastics) material such as auto parts, industrial fibers, food containers, and dishware. The PP material can also be run through a second PP quality control optical sorter 270 to remove any contaminants before being discharged in a staging conveyor to a PP storage cage 300 and then baled.

In certain illustrative embodiments, additional grades of plastic can be separated from the remaining stream with PP materials from PP optical sorter 260. This would include #3 Vinyl (PVC), #4 LDPE Low Density Polyethylene, #6 Polystyrene, and #7 Other. In an illustrative embodiment, the collected fraction of PP plastics such as ##s 3,4,5,6, and 7 plastics would be delivered to second PP quality control optical sorter 270, which would be configured to separate and eject, for example, #5 PP plastics into its own storage cage, while the other pass fractions #3, #4, #6, and #7, would fall into a separate storage cage, and await final baling.

Stage 10 (S10):

In Stage 10, "last chance" sorting can occur, whereby pass material from PP optical sorter 260 of Stage 9 can be conveyed to a "last chance" sort area where any remaining commodities are extracted either manually or automatically via a separation unit 310.

Stage 11 (S11):

In Stage 11, rejects material is identified. The remaining material from Stage 10 is residue/rejects material and is sent to a transfer station 320 by way of conveyor.

Stage 12 (S12):

In Stage 12, the remaining residue/rejects material, including but not limited to from Stage 9, can be removed from the site as "trash" via compactor box, compactor trailer, or loose-load, while the various recovered materials or "commodities" can be prepared for shipment by either the use of baling via a baler 330, or via loose-loading or a roll-off container.

The system and process described herein may include a plurality of sequential, non-sequential, or sequence independent steps or stages using, for example, the systems and equipment shown or described herein. Note that the process shown in FIGS. 1A & 1B is exemplary, and may be performed in different orders and/or sequences as dictated or permitted by the system and equipment described herein, and any alternative embodiments thereof, unless a particular ordering is otherwise specifically indicated in an embodiment set forth herein.

In addition, the processes described herein are not limited to the specific use of the system and equipment described herein but may be performed using any system and equipment that is capable of operating as described in connection with the processes shown in the FIGURES. Numerous arrangements of the various stages, techniques, equipment and materials can be utilized. In addition, not all stages, techniques, equipment and materials described herein need be utilized in all embodiments.

It should be noted that certain particular arrangements of equipment and/or process steps for the system and process described herein are materially distinguishable from, and provide distinct advantages over, previously known technologies, as described in further detail herein. The system and process described herein also displays certain unexpected and surprising results.

It is to be understood that the described subject matter is not limited to the exact details of construction, operation, exact materials, or illustrative embodiments shown and described, as modifications and equivalents will be apparent to one skilled in the art. Accordingly, the subject matter is therefore to be limited only by the scope of the appended claims.

What is claimed is:

1. A process for sorting and recovering materials from a solid waste stream, the process comprising:
    screening the solid waste stream in a primary screener to separate corrugated cardboard from the solid waste stream,
    screening the solid waste stream in a secondary screener comprising a vibrating sizing screen to separate 2D materials from 3D materials, resulting in a 2D solid waste stream having 2D materials comprising paper, film plastic, cardboard, brown fiber and containers, and a 3D solid waste stream having 3D materials comprising cardboard, plastic containers, aluminum containers and fines;
    passing the 2D solid waste stream through one or more optical sorters to separate plastic, cardboard, and brown fiber from the 2D solid waste stream;
    recombining the 2D solid waste stream and the 3D solid waste stream to produce a recombined solid waste stream;
    after recombining and with no additional treatment, introducing the recombined solid waste stream into a mechanical separator and separating the recombined solid waste stream into fines materials, mixed paper materials, and containers materials comprising bottles, cans, and residual paper;
    conveying the containers materials from the mechanical separator to one or more magnets to remove ferrous material;
    recovering residual paper from the containers material; and
    combining the residual paper with the mixed paper materials from the mechanical separator.

2. The process of claim 1, wherein the mechanical separator comprises one or more ballistic separators.

3. The process of claim 1, wherein the residual paper is recovered from the containers material in an optical sorter.

* * * * *